Oct. 10, 1933.   H. J. BURNISH   1,930,263
METHOD OF ELECTRICALLY BUTT WELDING SHEET METAL PIPE
Original Filed Nov. 12, 1927   2 Sheets-Sheet 1
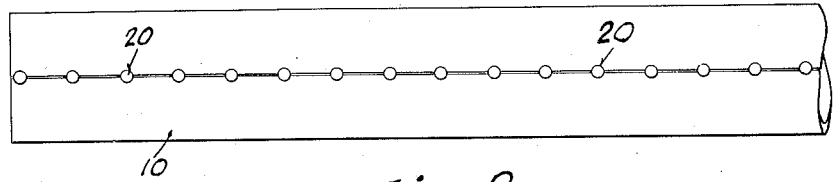
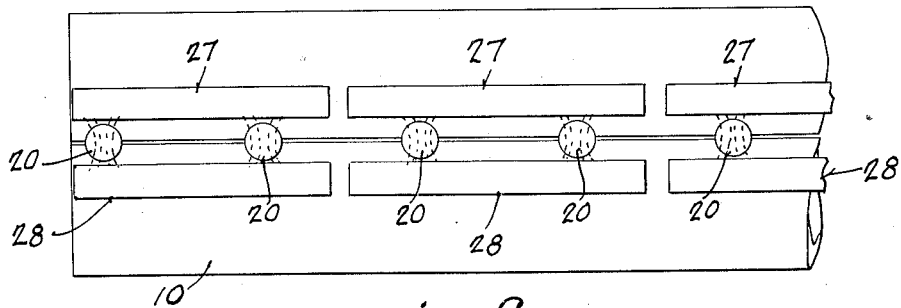
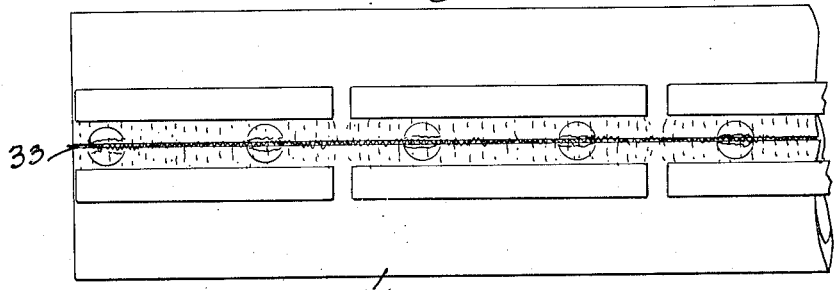
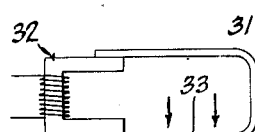
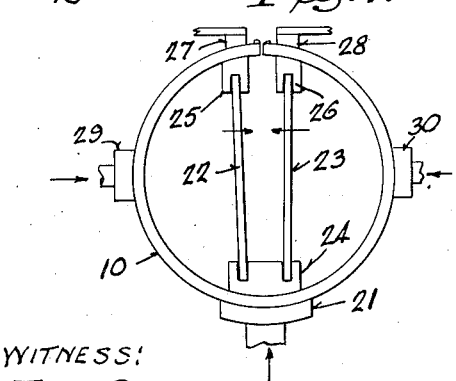
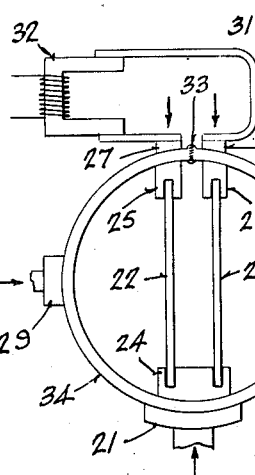
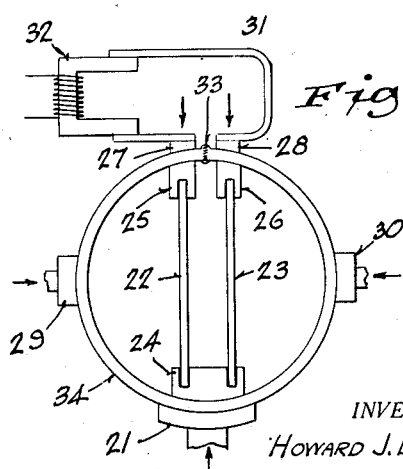
INVENTOR.
HOWARD J. BURNISH
BY
ATTORNEYS.

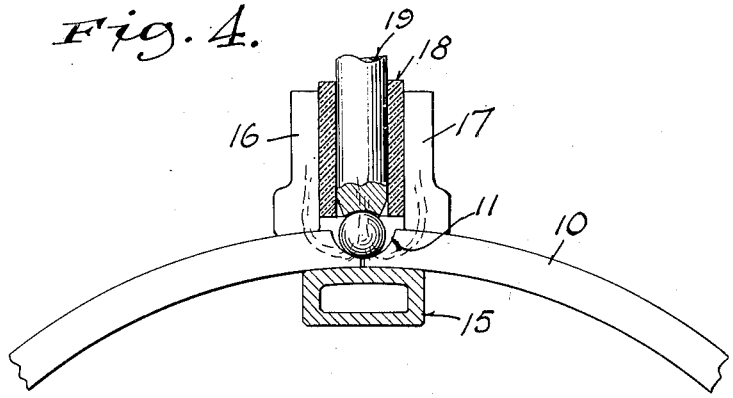
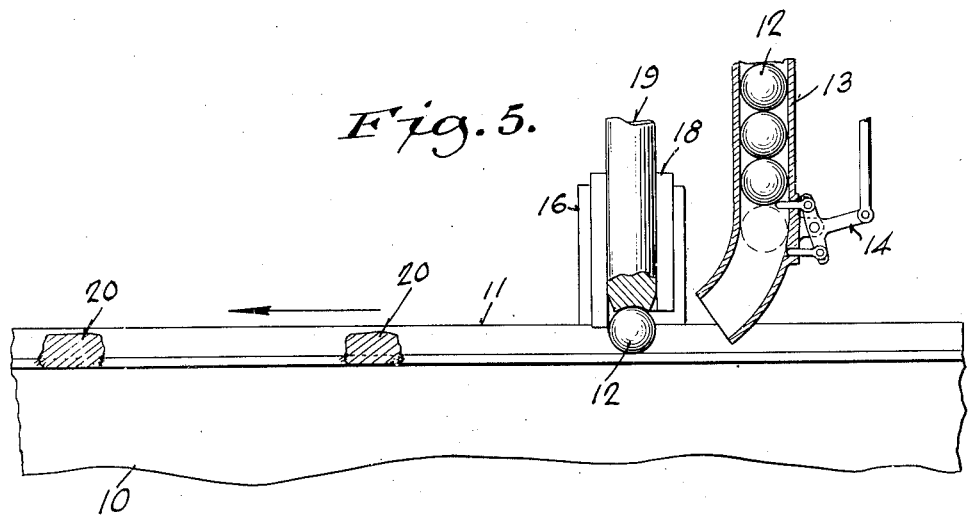
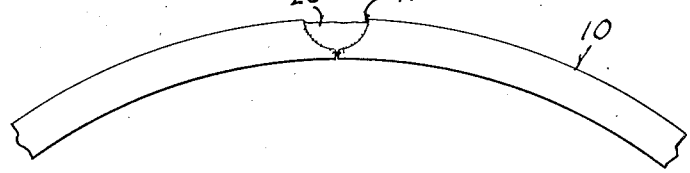

Patented Oct. 10, 1933

1,930,263

UNITED STATES PATENT OFFICE 1,930,263

METHOD OF ELECTRICALLY BUTT WELDING SHEET METAL PIPE

Howard J. Burnish, Milwaukee, Wis., assignor to A. O. Smith Corporation, Milwaukee, Wis., a corporation of New York Application November 12, 1927, Serial No. 232,787
Renewed March 23, 1933

19 Claims. (Cl. 219—10)

The present invention relates to the production of metal pipe of large diameter and great length, made from comparatively thin sheets of steel, the sheet being converted into a tube by bending the sheet on its longer dimensions, with the side edges of the sheet meeting on a line extending from one end of the tube to the other. The gauge of the sheet metal used, compared with the diameter of the pipe, is very small, and on account of the flexibility of the metal at the edges of the sheet, much difficulty has been experienced heretofore in securing and maintaining an accurate alignment of the meeting edges of the sheet, for the purpose of welding them together, in the production of lengthy pipe sections.

Pipe of this class is intended primarily for conducting fluids under reasonable pressures, but pipe manufactured in accordance with the invention is of such sturdy structure that it is capable of use where pressures are high. In some of the fields of use, it is demanded that the sections of pipe be of what may be regarded as excessive length, in order to lessen the necessity for the use of frequent coupling devices, thus reducing the outlay for the latter, and facilitating the coupling operations by lessening the number heretofore required. Under the present invention, the pipe can be made in single lengths up to the limit set by the transportation agencies, and thus the demands of the trade are met.

The present invention resides in a new method whereby the edges of the thin sheet formed into a tube are brought into alignment in a fixed longitudinal plane, and are secured and preserved in that relation during the subsequent operation of welding the edges together on a line which is continuous from one end of the pipe to the other. In the practice of such method, superior pipe is produced, in that a perfectly uniform joint of great strength is effected.

In order to achieve this very desirable result, I first bring the edges of the sheet into alignment and then tack such edges together preferably by spot welding at points a few inches apart, so that when the long tube is passed on to the butt welding machine, there will be no variation of the position of the aligned edges with respect to each other.

The tack or spot welded areas or bonds which unite the edges of the sheet provide a path for the passage of the current of electricity by means of which such edges are brought to a welding heat. Air gaps exist between the successive spot welded areas, which gaps will not be traversed by the electrical current, in the initial movement of the latter. But the full force of the current is thrown upon the spot welded bonds, and on account of the greater resistance of the latter to the passage of the current through the restricted areas, the bonds are quickly melted away. Thereupon, the current continues to flow but in the form of an arc, which immediately jumps the air gaps and quickly brings the now slightly separated edges to a welding heat. When this condition is attained, the edges are brought together and a "flash" welded line co-extensive with the length of the tube is established.

When the tube with its edges thus preliminarily connected is transferred to the butt welding machine, it is necessary to hold such edges against reaction when the spot welded bonds are melted away at the time that the arc is established across the gap. To attain this, I pass the tube over stop bars or spacers located within the tube and bear ring upon the inside of the latter near the welding line and at each side thereof, and apply pressure on the same lines exteriorly of the tube, so as to clamp the latter firmly and prevent disturbance of the arrangement of the edges of the tube. I use the current conducting electrodes of the butt welding machine as a means for effecting the clamping action of the edges of the sheet upon the spacers.

The electrodes and the stop bars or spacers between which the edges of the tube are clamped, are movable when pressure is applied to the side of the tube, to move the edges of the tube one toward the other, and bring the heated edges of the tube into engagement, to produce a butt welded joint to complete the pipe structure.

Having thus outlined the nature and purpose of my invention, I will now proceed to describe the same in detail, and will point out the novelty thereof in the appended claims.

In the accompanying drawings:

Figure 1 is a plan view of one end of a tube, the edges of which have been brought into alignment and bonded by spot welding at separated points, in order to maintain the relative position of such edges during the subsequent complete line welding of the pipe.

Fig. 2 is an enlarged view of the end of a tube the edges of which are connected by spot welds, and showing the arrangement of the long electrodes on each side of the welding line, for conducting the current, whereby the spot welded bonds are melted away in the first rush of current, and the edges heated by the arc which follows.

Fig. 3 is a view similar to Fig. 2, showing how the arc extends the length of the line of the weld, so as to heat the edges of the tube to form a butt welded joint running from one end of the pipe to the other.

Fig. 4 is an end view of a sector of the tube, showing the manner in which the spot welding at points is effected.

Fig. 5 is a longitudinal view of a section of the tube, on the scale of Fig. 4, showing a conventional means for supplying the material used in spot welding.

Fig. 6 is an end view similar to Fig. 4 showing one of the spot welded bonds.

Fig. 7 is an end view of a tube showing the edge clamping means including the electrodes, through which latter the metal is heated preparatory to butt welding.

Fig. 8 is a similar view showing the pipe after having been butt welded along the meeting edges of the tube, and showing also a transformer with connections therefrom to the heating electrodes.

Fig. 9 illustrates a modification of the preliminary spot welding of the tube.

In carrying out my invention, I use a relatively thin steel sheet having a length of thirty feet or approximately that of the pipe section to be made, and a width sufficient to form a pipe of the desired diameter, upon the sheet being converted by bending it longitudinally into the form of a tube, with its longitudinal or side edges abutting in a horizontal plane.

Either before or after the sheet is formed into a tube, indicated by the numeral 10, I may chamfer the edges of the sheet to form a groove 11, when such edges are brought together, as illustrated in Figs. 4, 5 and 6. As the tube is relatively passed through the spot welding jig, bonding elements 12, preferably in the form of metal balls of suitable composition, are released from a hopper 13, by a suitable escapement device 14, which is operated in consonance with the relative travel of the tube, so as to release the balls 12 singly at appropriate instants of time.

Arranged within the tube and under the line to be welded, is an anvil or shell 15, upon which the edges of the sheet forming the tube are brought into alignment by electrodes 16 and 17, which are actuated so as to apply the desired pressure in aligning and holding the edges of the tube upon the chill 15. Arranged between the electrodes 16 and 17, and insulated therefrom as at 18, is a current conducting spot welding electrode 19, the end of which is brought into engagement with the ball 12, at the moment that the latter is released by the escapement device 13. The pressure exerted by the electrode 19 makes a good electrical contact between the ball 12 and the tube 10. A flash of current heats the ball and the contiguous metal of the tube, the ball being fused in such action and transformed into a bond 20 uniting the meeting edges of the tube. This operation is continued until the tube has traversed the spot welding jig, and the tube will then be in the form illustrated in Fig. 1, with the meeting edges in perfect alignment and registry, and secured by spaced bonds, so that no disarrangement of the relation of one edge to the other can occur in the succeeding welding operation.

The tube is then passed to the butt welding machine, in which it is supported upon a rest 21, capable of movement as desired. The butt welding machine is provided with elongated spacers 22 and 23, inserted within the tube to resist its deformation under the clamping pressure exerted by the electrodes of the welding machine. The spacers 22 and 23 are seated at their lower edges in a base 24, which rests upon the lower side of the tube interiorly thereof. The spacers 22 and 23 carry at their upper edges bars 25 and 26, which engage the tube interiorly at the opposite side on lines parallel with and close to the edges to be welded. Suitable insulation will be provided between the spacers 22 and 23 and the base 24, or between the said spacers and the bars 25 and 26.

Electrodes 27 and 28 arranged in pairs are then applied to the exterior of the tube, close to the meeting line of the edges of the tube, for the length of the tube. The clamping pressure of the electrodes 27 and 28 upon the edges of the tube is taken up by the spacers 22 and 23, supported by the bottom rest 21. The spacers 22 and 23 are mounted for rocking movement upon the base 24, and the electrodes 27 and 28 for movement toward each other, and with the edges of the tube clamped between them, may be moved to bring the edges together, through the operation of plungers 29 and 30, acting at opposite sides of the tube after such edges have been brought to a welding heat. But the spacer 23 and the electrode 28 only, may have movement under the action of the plunger 30, in which arrangement the part 29 will function as a stop. The leads 31 from the transformer 32 to the electrodes 27 and 28 are flexible.

The full force of the current utilized in connection with the butt welding machine, is thrown upon the bonds 20, which by reason of their resistance to the passage of the current, are immediately melted. The current then forms an arc which spreads out and traverses the edges of the tube between the spot welded bonds, and instantly heats such edges to a welding temperature for the full length of the tube. The pressure of the plungers 29 and 30 acts to bring the fused edges into contact, and a "flash" butt welded seam 33 extending the length of the pipe 34 is formed. The movement of the parts 21, 28 and 29 may be effected by any suitable mechanism.

The flash formation which may exist by reason of the extrusion of metal upon the inside or the outside of the pipe can be removed by a simple machining operation, so as to restore the symmetry of the pipe.

In Fig. 9 I have illustrated in conventional manner a modified application of the spot welding operation, by which I avoid chamfering the meeting edges of the tube to produce a groove for the accommodation of the balls 12. In this simpler construction, the plain edges of the sheet are brought together in the formation of the tube, as before, and I introduce flat metal discs 35 at spaced points along the line of the meeting edges, which discs are spot welded to bond the edges of the tube, as before. The discs 35 may be produced as die punchings.

Any frictional engagement of the pipe 34 with the spacers 22 and 23, at the conclusion of the line welding operation, such as acts to retard the easy withdrawal of the spacers from the pipe, is overcome by pressing opposite sides of the pipe inwardly toward the spacers, and freeing the edges of the spacers from their contact with the pipe on the intermediate opposite lines. I find this more effective than using a collapsible spacer of complicated and costly construction and operation. Before being subjected to the end finishing operations, the pipe is acted upon by the dies of a sizing press, whereby a true circular shape is imparted to the pipe.

Having thus described my invention what I desire to secure by Letters Patent of the United States, is:

1. The method of making pipe which consists in bending a metal sheet into the form of a tube and bringing the meeting edges of the sheet into alignment, tack welding the said edges together at spaced points to preserve their alignment, passing an electric current through the aligned edges to heat the same and thereafter pressing said edges together to form a welded joint extending the length of the pipe.

2. The method of making pipe which consists in bending a metal sheet into the form of a tube and bringing the meeting edges of the sheet into alignment, spot welding the said edges at spaced points to bond them and preserve their alignment, passing an electric current through the aligned edges to heat the same and thereafter pressing said edges together to form welded joint extending the length of the pipe.

3. The method of making pipe which consists in bending a metal sheet into the form of a tube and bringing the meeting edges of the sheet into alignment, spot welding the said edges at spaced points to bond them and preserve their alignment, passing an electric current through the bonds to melt them and heat the aligned edges to a welding temperature and thereafter pressing said edges together to unite the said edges by a welded joint extending the length of the pipe.

4. The method of making pipe which consists in bending a metal sheet into the form of a tube and bringing the meeting edges of the sheet into alignment, spot welding the said edges at spaced points to bond them and preserve their alignment, passing an electric current through the bonds to melt them away and establish an arc to heat the aligned edges to a welding temperature and thereafter pressing said edges together to unite the said edges by a welded joint extending the length of the pipe.

5. The method of making pipe which consists in bending a metal sheet into the form of a tube and bringing the meeting edges of the sheet into alignment, spot welding the said edges at spaced points to bond them to preserve their alignment, then passing an electric current through the bonds to melt them away and establish an arc to heat the aligned edges to a welding temperature, and pressing the heated edges together to unite them by a welded joint extending the length of the pipe.

6. The method of making pipe which consists in bending a metal sheet into the form of a tube and bringing the meeting edges of the sheet into alignment, placing metal bonding elements at spaced points in the line of the said meeting edges, fusing the said elements to connect the said edges and preserve their alignment, passing an electric current through the aligned edges to heat the same and thereafter pressing said edges together to unite them by a welded joint extending the length of the pipe.

7. The method of making pipe which consists in chamfering the side edges of a metal sheet and bending the sheet into the form of a tube with a groove at its meeting edges, aligning such edges, placing metal balls at spaced points in the said groove, fusing the balls to bond the said edges and preserve their alignment, passing an electric current through the bonds to melt them and heat the aligned edges to a welding temperature and thereafter pressing the edges together to unite the said edges by a welded joint extending the length of the pipe.

8. The method of making pipe which consists in chamfering the side edges of a metal sheet and bending the sheet into the form of a tube with a groove at its meeting edges, aligning such edges, placing metal balls at spaced points in the said groove, spot welding the balls by an electric current to bond the said edges and preserve their alignment, passing an electric current through the bonds to melt them and heat the aligned edges to a welding temperature and thereafter pressing said edges together to unite the said edges by a welded joint extending the length of the pipe.

9. The method of making pipe which consists in bending a metal sheet into the form of a tube and bringing the meeting edges of the sheet into alignment, spot welding the said edges at spaced points through separate metallic bonding elements to preserve the alignment of the edges, then passing an electric current through the bonds to melt them away and establish an arc to heat the aligned edges to a welding temperature, and pressing the heated edges together to unite them by a welded joint extending the length of the pipe.

10. The method of welding a longitudinal seam of a sheet metal pipe section, which comprises aligning and bonding the spaced edges to be welded, clamping the pipe section while said edges are so aligned to maintain said edges in proper alignment during subsequent relative movement thereof, heating said edges by means of an electric current, and finally pressing said edges together to effect a simultaneous welding thereof for the full length of said pipe section.

11. The method of welding a longitudinal seam of a sheet metal pipe section, which comprises aligning and bonding the spaced edges to be welded, clamping the pipe section while said spaced edges are so aligned to maintain said edges in proper alignment during subsequent relative movement thereof, heating said spaced edges by means of an electric arc established therebetween, and finally pressing said edges together to effect a simultaneous welding thereof for the full length of said pipe section.

12. The method of welding a longitudinal seam of a sheet metal pipe section, which comprises aligning the spaced edges to be welded, integrally bonding said edges at intervals therealong to preserve their alignment, clamping said pipe section while said edges are maintained in alignment by the bonds, passing an electric current through said bonds to melt the same away and to establish an arc between said spaced edges to heat the same, and then pressing said edges together to simultaneously weld the same for the full length thereof while said edges are maintained in alignment by means of the clamping mechanism.

13. The method of welding a longitudinal seam of a sheet metal pipe section which comprises aligning the edges to be welded, maintaining said edges in alignment by means of fusible metallic elements welded at intervals across the seam, causing the welding current to be concentrated in said fusible elements to effect an initial flow of said current across the seam and thereby causing an electric arc to be established between the edges to bring the same to a fusing temperature, and thereafter applying an upsetting pressure to the edges to weld the same for the full length of the pipe section.

14. The method of welding a longitudinal seam of a sheet metal pipe section which comprises aligning the edges to be welded, maintaining said edges in alignment by means of fusible metallic elements welded at intervals across the seam, fusing said elements with welding current and establishing a flashing arc at the position of each of the elements, causing said arcs to spread along the entire seam to be welded to bring the edges uniformly to welding temperature, and thereafter applying upsetting pressure to said edges to effect a weld for the full length of the joint.

15. The method of welding the edges of metallic members which comprises providing fusible conductors between the edges for establishing flashing arcs at predetermined spaced intervals along the seam to be welded, and causing the arcs to spread longitudinally until said arcs merge into one continuous arc extending for the full length of the seam to heat the edges to be welded to a fusion temperature, and thereafter applying upsetting pressure to the edges to complete the weld.

16. The method of welding two abutting sheets of metal which comprises aligning said sheets with respect to each other, welding metallic bonds to both of the sheets at intervals along the seam to preserve the alignment, applying a welding current to each of the edges and causing an initial flow of current through said bonds to fuse the same and to establish a flashing arc between the edges to be welded to heat the same to welding temperature, and thereafter applying pressure to force the heated edges into contact with each other to form a welded joint the full length of the seam.

17. The method of joining abutting edges of metal sheets which comprises bonding the edges to be welded in alignment, applying electric current through the bonds to fuse the same and establish an electric arc across the edges for the length of the seam to be welded, and thereafter applying upsetting pressure to the edges to force the same together while heated to form a welded joint.

18. The method of making a welded seam between the opposed edges of metal plate forming a cleft, comprising providing means for conducting current from one metal edge to the other simultaneously at intervals along the cleft, fusing the conducting means to establish arcs to heat the edges, and pressing the heated edges into engagement.

19. The method of welding the edges of metallic members comprising aligning the edges to be welded, bonding the edges at intervals to retain them in spaced relation and to provide current conductors, causing sufficient electric current to flow through the bonds to fuse them and establish electric arcs, maintaining the arcs until they spread throughout the length of the opposed edges to bring them to a welding condition, and then pressing the edges into engagement to complete the welding operation.

HOWARD J. BURNISH.